W. M. BROOKS.
SELF LOCKING SEAL.
APPLICATION FILED MAR. 1, 1916.
1,180,693. Patented Apr. 25, 1916.
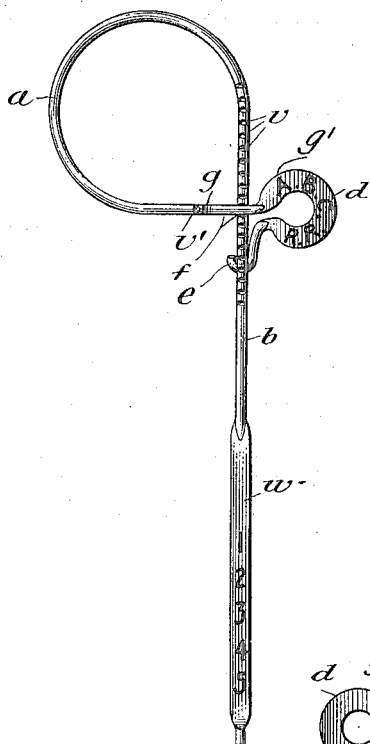
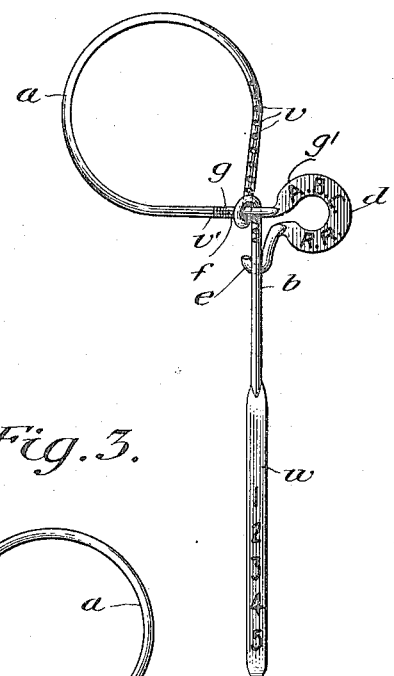
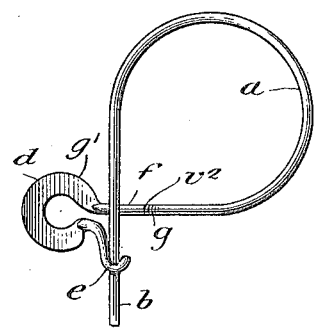
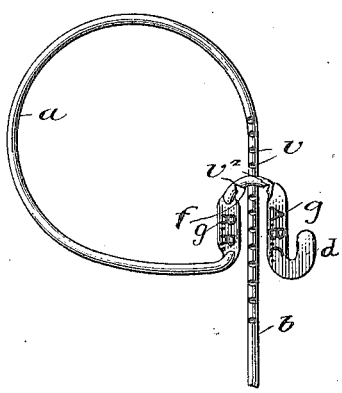
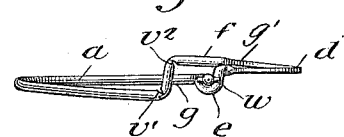

UNITED STATES PATENT OFFICE.

WINFRED MUDGE BROOKS, OF EAST ORANGE, NEW JERSEY, ASSIGNOR TO E. J. BROOKS & CO., OF NEW YORK, N. Y., A CORPORATION OF NEW YORK.

SELF-LOCKING SEAL.

1,180,693.      Specification of Letters Patent.      Patented Apr. 25, 1916.

Application filed March 1, 1916. Serial No. 81,371.

*To all whom it may concern:*

Be it known that I, WINFRED MUDGE BROOKS, a citizen of the United States of America, and a resident of East Orange, in the State of New Jersey, have invented a new and useful Improvement in Self-Locking Seals, of which the following is a specification.

This invention relates to metallic seals adapted to be applied and sealed without tools and to prevent tampering therewith after sealing without detection and to certain novel improvements as hereinafter more particularly described and claimed.

One sheet of drawings accompanies this specification as part thereof, in which like reference characters denote like parts throughout.

Figure 1 is a face view of the improved seal unsealed; Fig. 2 is a face view of same sealed; Fig. 3 is a back view of a part of an unsealed seal; Fig. 4 is an end view of an unsealed seal showing more clearly the lateral bend hereinafter referred to, while Fig. 5 is a face view of a modified form showing clearly both laterals in the same plane.

Referring to the drawings, $a$ represents the primary loop, $b$ the sealing shank with flattened and embossed end $w$, $d$ represents the secondary coil, $e$ a catch and guard, $f$ the seal core about which the nicked shank is wrapped in a locking coil and $g$, $g'$ lateral bends or projections respectively from the seal core adapted to prevent the locking coil from being slipped from the seal core, $v$ indicates nicks cut in the sealing shank and $v'$ and $v^2$ nicks cut in the inner side of the bends of the laterals from the seal core, adapted to produce fracture upon any attempt at unbending.

The seal as it leaves the factory appears as in Fig. 1 or Fig. 5 consisting of a piece of wire bent into the shape shown and nicked as indicated.

In operation the primary loop is passed through the staples or other fastenings to be sealed and the sealing shank is then closely coiled around the seal core $f$ with its nicked side innermost. The two laterals $g$ or $g$ and $g'$ at either end of the seal core $f$ make the proper positioning of the locking coil upon the seal core sure and prevent any displacement therefrom.

The seal is adapted to bear a serial number impressed upon the sealing shank and to have the name or initials of the user embossed upon the secondary coil as shown and may obviously be made of wire of round or other suitable cross section. Other modifications will suggest themselves to those skilled in the art.

Having thus fully described my invention, I claim:—

1. In a self locking seal of the nicked wire type, a seal core part having a lateral projection at each end thereof adapted to prevent the displacement of the locking coil therefrom and means to prevent the undetected bending or removal of said lateral projections.

2. In a self locking seal of the nicked wire type, a seal core part having a lateral projection at each end thereof adapted to prevent the displacement of the locking coil therefrom and transverse cut nicks on the inner sides of the bends of the said laterals from the seal core part.

3. A self locking seal of wire, comprising a primary loop, a sealing shank integral with one end thereof, a lateral bend in the other end thereof, a seal core part in a plane parallel with said primary loop adjacent to said lateral bend, a secondary loop flattened and embossed integral with said seal core and terminating in a catch said secondary loop forming a lateral projection from the seal core and transverse cut nicks in the sealing shank adjacent to the seal core and on the inner side of the bends of the lateral from the primary loop and the seal core, substantially as hereinbefore specified.

WINFRED MUDGE BROOKS.

Witnesses:
ROSSLYN JAMONNEAU,
CHARLES C. LURICH.

Copies of this patent may be obtained for five cents each, by addressing the "Commissioner of Patents, Washington, D. C."